(12) United States Patent
Galozy et al.

(10) Patent No.: US 12,476,719 B2
(45) Date of Patent: Nov. 18, 2025

(54) METHOD AND ANALYSIS SYSTEM FOR ANALYZING TEST CAPABILITIES OF A MOBILE COMMUNICATION TEST INSTRUMENT

(71) Applicant: Rohde & Schwarz GmbH & Co. KG, Munich (DE)

(72) Inventors: Manuel Galozy, Munich (DE); Jesper Sandvad, Munich (DE); Kristian Soerensen, Munich (DE); Samuele Tortelli, Munich (DE); Anders Poulsen, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 447 days.

(21) Appl. No.: 18/050,599

(22) Filed: Oct. 28, 2022

(65) Prior Publication Data

US 2024/0146422 A1    May 2, 2024

(51) Int. Cl.
  *H04B 17/00* (2015.01)
  *H04L 43/50* (2022.01)
(52) U.S. Cl.
  CPC ......... *H04B 17/0085* (2013.01); *H04L 43/50* (2013.01)
(58) Field of Classification Search
  CPC ..... H04B 17/0085; H04L 43/50; H04W 24/06
  USPC ...................................................... 455/67.11
  See application file for complete search history.

(56) References Cited

U.S. PATENT DOCUMENTS

| 10,524,144 B2 | 12/2019 | Ogawa et al. |
| 2009/0112505 A1* | 4/2009 | Engel ..................... G01D 21/00 702/123 |
| 2012/0176919 A1 | 7/2012 | Callender et al. |
| 2021/0173011 A1* | 6/2021 | Kajbaf ..................... G06F 30/27 |

\* cited by examiner

*Primary Examiner* — Eugene Yun
(74) *Attorney, Agent, or Firm* — CHRISTENSEN O'CONNOR JOHNSON KINDNESS PLLC

(57) ABSTRACT

A method of analyzing test capabilities of a mobile communication test instrument is described. The method includes the steps of: receiving device under test (DUT) parameters being associated with a device under test, wherein the DUT parameters comprise information on a subset of band configurations associated with a device under test, wherein the subset of band configurations is to be tested; receiving, from an instrument database, test instrument parameters being associated with the test instrument, wherein the test instrument parameters comprise information on features of the test instrument; and determining, by an analysis circuit, whether the test instrument is suitable for testing the device under test based on the DUT parameters and based on the test instrument parameters. Further, a computer program product embodied on a non-transitory computer-readable medium and an analysis system for analyzing test capabilities of a mobile communication test instrument are described.

20 Claims, 3 Drawing Sheets

METHOD AND ANALYSIS SYSTEM FOR ANALYZING TEST CAPABILITIES OF A MOBILE COMMUNICATION TEST INSTRUMENT

FIELD OF THE DISCLOSURE

Embodiments of the present disclosure generally relate to a method of analyzing test capabilities of a mobile communication test instrument. Embodiments of the present disclosure further relate to a computer program product embodied on a non-transitory computer-readable medium and to an analysis system for analyzing test capabilities of a mobile communication test instrument.

BACKGROUND

In order to test mobile communication equipment, test instruments are used in order to simulate certain bandwidth configurations of a device under test, e.g. of a smartphone.

With the advent of LTE and particularly of 5G New Radio, the number of possible configurations of the uplink and downlink channels of corresponding devices under test have increased drastically.

Assessing whether a certain test instrument is suitable for testing a particular band configuration of a device under test usually has to be done manually, which is a time-consuming task and requires considerable amounts of expertise from the user.

Thus, there is a need for a method and for an analysis system that allow for assessing the test capabilities of a mobile communication test instrument.

SUMMARY

Embodiments of the present disclosure provide a method of analyzing test capabilities of a mobile communication test instrument. In an embodiment, the method comprises a step of receiving device under test (DUT) parameters associated with a device under test. In an embodiment, the DUT parameters comprise information on a subset of band configurations associated with a device under test, wherein the subset of band configurations is to be tested. The method also includes the step of receiving, from an instrument database, test instrument parameters being associated with the test instrument. In an embodiment, the test instrument parameters comprise information on features of the test instrument. The method further includes the step of determining, by an analysis circuit, whether the test instrument is suitable for testing the device under test based on the DUT parameters and based on the test instrument parameters.

Therein and in the following, the term "subset" is understood to denote a set of band configurations that is usually smaller than the set of all possible band configurations. In some embodiments, the subset of band configurations corresponds to a specific set of band configurations of the device under test that a user wants to test. Accordingly, the user may input the subset of band configurations by a suitable user interface. Alternatively or additionally, the subset of band configurations may comprise standardized band configurations of the device under test that are to be tested routinely. However, it is to be understood that the subset of band configurations may also be the whole set of all possible band configurations of the device under test.

The DUT parameters and the test instrument parameters may be received by an analysis circuit, e.g., by an analysis circuit of a suitable computer device. The analysis circuit may automatically determine whether the test instrument is suitable for testing the device under test based on the DUT parameters and based on the test instrument parameters.

Thus, the method according to the present disclosure provides an automated assessment of the test capabilities of the test instrument by providing information on whether the device under test can be tested with the test instrument.

This significantly reduces the time necessary for assessing the test capabilities of the test instrument. Moreover, the expertise required from a user of the test instrument in order to assess the test capabilities of the test instrument is significantly reduced.

According to an aspect of the present disclosure, the test instrument parameters comprise, for example, information on a number of radio frequency (RF) units of the test instrument, on a number of intermediate frequency (IF) units of the test instrument, and/or on a number of accelerator units of the test instrument.

Therein and in the following, the term "RF unit" is understood to denote a unit comprising suitable circuits being configured to generate and/or receive RF signals in the frequency bands defined by the LTE standard and in the FR1 frequency band defined in the 5G New Radio standard. Moreover, the term "IF unit" is understood to denote a unit comprising suitable circuits being configured to generate and/or receive RF signals in the FR2 frequency band defined in the 5G New Radio standard. Further, the term "accelerator unit" is understood to denote a unit comprising suitable circuits being configured to perform at least layer 1 processing in order to emulate a mobile communication cell. Accordingly, the more accelerator units the test instrument comprises, the more mobile communication cells can be emulated.

Thus, the number of RF units, the number of IF units, and the number of accelerator units determine the test capabilities of the test instrument at least partially. Conversely, the corresponding test instrument parameters can be used to assess whether the subset of band configurations can be tested by the test instrument.

It is also conceivable that the test instrument parameters may comprise information on connectors and/or RF cabling used in combination with the test instrument. For example, a user may input the corresponding information via a suitable user interface. Thus, connectors and/or RF cabling may be considered for assessing whether the test instrument is compatible with the subset of band configurations of the device under test.

In an embodiment of the present disclosure, the DUT parameters comprise information on a bandwidth to be tested and/or on a multiple-input-multiple-output (MIMO) configuration of the device under test. Thus, additional information for assessing whether the test instrument is suitable for testing the device under test is provided.

If it is determined that the test instrument is unsuitable for testing the device under test, a different type of test instrument being suitable for testing the device under test may be automatically determined. In other words, a suitable test instrument may be automatically recommended to a user. For example, the different type of test instrument may be a test instrument comprising at least one additional RF unit, at least one additional IF unit, and/or at least one additional accelerator unit.

However, it is also conceivable that if it is determined that the test instrument is suitable for testing the device under test, a different type of test instrument being suitable for testing the device under test may be automatically determined. For example, the test instrument having the minimum hardware configuration required for testing the device under test may be determined, for example recommended to the user. This is particularly advantageous if the user owns several different types of test instruments, as the user may better utilize the test instruments for performing tests on different devices under test in parallel.

According to another aspect of the present disclosure, the instrument database comprises, for example, information on features of a plurality of different test instruments, wherein the different type of test instrument is determined based on the information on features encompassed in the instrument database. In other words, the instrument database may comprise sets of test instrument parameters associated with a plurality of different types of test instruments. Thus, it is possible to automatically determine different types of test instruments being suitable for testing the device under test.

In some embodiments, a list of different types of test instruments being compatible with the band configuration of the device under test is generated. Accordingly, the user may choose from the list of different types of test instruments that are suitable for testing the subset of band configurations of the device under test.

If it is determined that the device under test is unsuitable for testing the device under test, a different band configuration of the device under test may be automatically determined, wherein the test instrument is suitable for testing the device under test with the different band configuration. In other words, at least one different band configuration or a different set of band configurations of the device under test that can be tested by the test instrument may be recommended to the user. For example, a less complex cell deployment may be recommended, such as using a 2×2 MIMO or a single-input-single-output (SISO) configuration instead of a 4×4 MIMO configuration.

In a further embodiment of the present disclosure, a DUT database comprising information on different possible band configurations of the device under test is provided, wherein the different band configuration is determined based on the DUT database. For example, the DUT database may comprise a plurality of different (valid) band configurations of the device under test. Thus, the different band configuration may be determined by comparing the plurality of band configurations stored in the database with the test instrument parameters, such that (valid) band configurations of the device under test that are compatible with the test instrument can be determined.

According to an aspect of the present disclosure, a list, for example, of band configurations of the device under test being compatible with the test instrument is generated. Thus, the user may choose from the list of different band configurations of the device under test that are compatible with the test instrument.

According to another aspect of the present disclosure, the DUT parameters are compared, for example, with a database of valid DUT configurations in order to determine whether the configuration of the device under test is valid. In other words, it may be automatically determined whether the band configuration(s) entered by a user correspond to a valid configuration of the device under test.

If it is determined that the configuration of the device under test is not valid, at least one valid band configuration of the device under test may be determined and recommended to the user. For example, the database of valid DUT configurations may comprise a 3GPP database comprising valid configurations according to a 3GPP LTE standard or a 3GPP 5G standard.

In an embodiment of the present disclosure, visualization data is generated by a visualization circuit, wherein the visualization data comprises information on the DUT parameters, the test instrument parameters, and/or whether the test instrument is suitable for testing the device under test. The visualization data may comprise any suitable elements such that these pieces of information are illustratively presented to a user, e.g. lists, diagrams, graphs, color-coded backgrounds, labels, warning signs, etc. In some embodiments, the visualization data is displayed by a display.

In an embodiment of the present disclosure, the subset of band configurations to be tested is adaptable by a user interface. In other words, the user may input the subset of band configurations to be tested, may adapt individual band configurations of the subset of band configurations, add individual band configurations to the subset of band configurations, and/or remove individual band configurations from the subset of band configurations by the user interface.

In a further embodiment of the present disclosure, the subset of band configurations relates to LTE and/or 5G configurations. Accordingly, the device under test is a mobile communication device being configured to communicate with other electronic devices based on an LTE standard and/or based on a 5G New Radio standard.

According to an aspect of the present disclosure, a control circuit is provided. In an embodiment, the control circuit is configured to automatically control the test instrument and/or the device under test. In other words, tests may be automatically conducted on the device under test based on the subset of band configurations, for example after it is determined that the test instrument is suitable for testing the device under test.

For example, the user may select one, several, or all of the band configurations comprised in the subset of band configurations, and the corresponding tests may be performed automatically.

Embodiments of the present disclosure further provide a computer program product embodied on a non-transitory computer-readable medium. The computer program product comprises program code being configured to perform embodiments of the method described above when the program code is executed on a processing circuit.

Regarding the advantages and further properties of the computer program product, reference is made to the explanations given above with respect to the methods, which also hold for the computer program products and vice versa.

Embodiments of the present disclosure further provide an analysis system for analyzing test capabilities of a mobile communication test instrument. In an embodiment, the analysis system comprises an instrument database and an analysis circuit. The analysis circuit is configured to receive DUT parameters. The DUT parameters are associated with a device under test, and comprise information on a subset of band configurations associated with a device under test. The subset of band configurations is to be tested. The analysis circuit is configured to receive test instrument parameters from the instrument database. The test instrument parameters are associated with the test instrument, and comprise information on features of the test instrument. The analysis circuit is configured to determine whether the test instrument is suitable for testing the device under test based on the DUT parameters and based on the test instrument parameters.

Regarding the advantages and further properties of the analysis system, reference is made to the explanations given above with respect to the method, which also hold for the analysis system and vice versa.

In some embodiments, the analysis circuit and the instrument database are integrated in a common computer device. For example, the computer device may be a personal computer, a laptop, a notebook, a MAC, a smartphone, or any other type of suitable smart device. The instrument database may be stored in a memory of the common computer device. The computer device may be connected to an external database stored on a server so as to receive updates and/or changes of the instrument database.

In some embodiments, the analysis circuit and the instrument database are integrated in different computer devices. For example, the analysis circuit may be integrated in a first computer device being established as a personal computer, a laptop, a notebook, a MAC, a smartphone, or any other type of suitable smart device. The instrument database may be stored on a memory of a second computer device, for example on a server, being connected with the first computer device via a wide area network (WAN), a local area network (LAN), and/or via the internet.

In an embodiment of the present disclosure, the instrument database is established as a cloud database. In other words, the instrument database may be distributed over several computer devices, for example over several servers, that together establish a computer cloud or server cloud.

Similarly, then DUT database described above may be established as a cloud database. In other words, the DUT database may be distributed over several computer devices, for example over several servers that together establish a computer cloud or server cloud.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
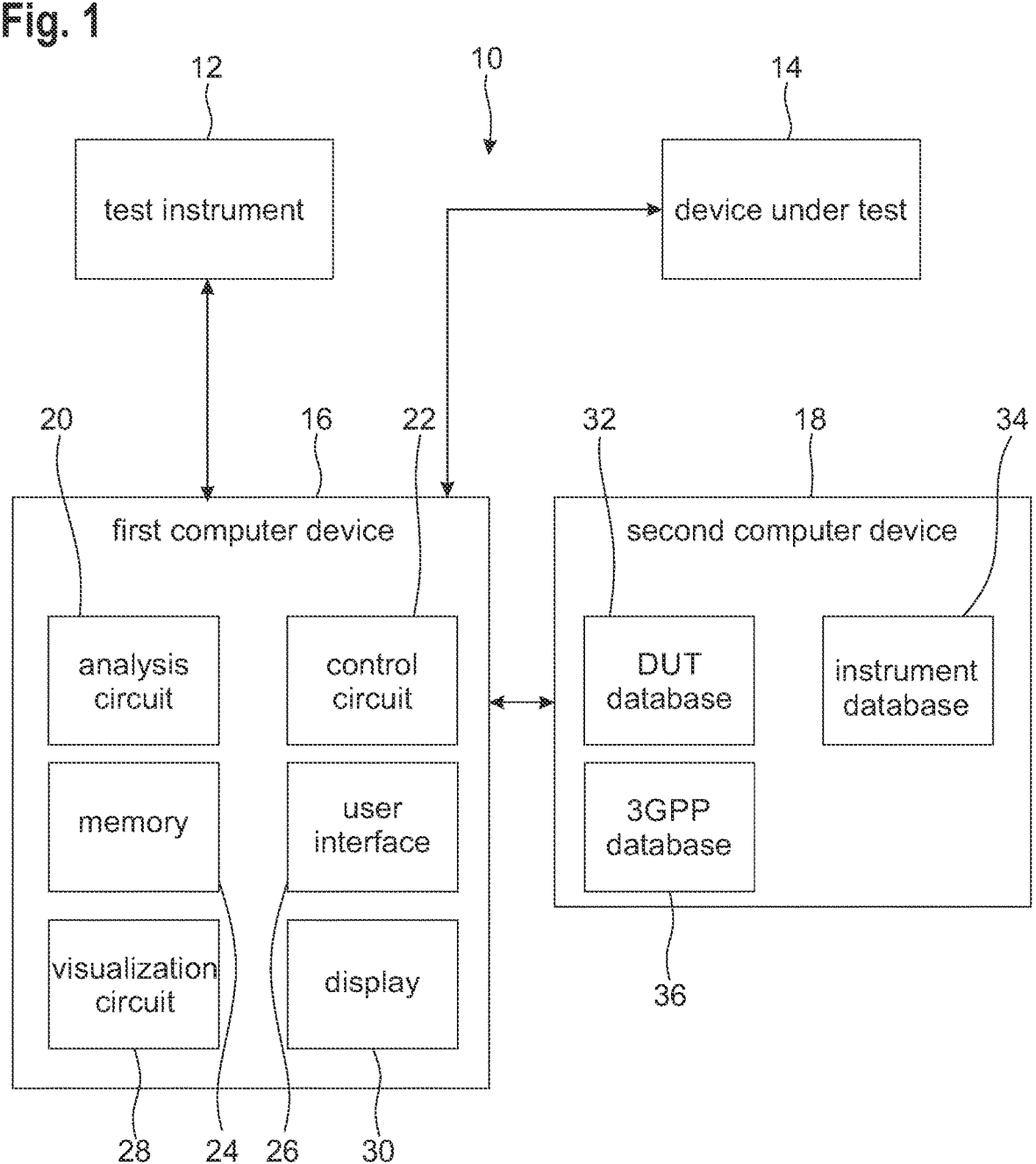
FIG. 1 schematically shows an analysis system according to an embodiment of the present disclosure.

FIG. 1 schematically shows an analysis system 10 for analyzing test capabilities of a mobile communication test instrument 12. In general, the test instrument 12 is configured to perform over-the-air (OTA) tests on a device under test 14, wherein the device under test 14 is an electronic mobile communication device being configured to communicate via LTE and/or 5G New Radio. In some embodiments, the device under test 14 is a user device such as a mobile phone, a tablet, or any other type of LTE/5G-compatible (smart) device.

The test instrument 12 may be established as a base station emulator that is configured to emulate a base station or base stations associated with one or more mobile communication cells. Accordingly, the test instrument 12 may comprise or may be connected at least one antenna, such that the test instrument 12 may transmit radio frequency (RF) signals to the device under test 14 and/or receive RF signals from the device under test 14 in order to assess a performance of the device under test 14. In some embodiments, the test instrument 12 is configured to transmit data to the device under test 14 via a downlink channel of the device under test 14 and/or to receive data from the device under test 14 via an uplink channel of the device under test 14.

The analysis system 10 comprises a first computer device 16 and, optionally, a second computer device 18 being connected with the first computer device 16 in a signal-transmitting manner. Therein and in the following, the term "connected in a signal transmitting manner" is understood to denote a cable-based or wireless connection that is configured to transmit signals between the respective devices or components.

In general, the first computer device 16 comprises an analysis circuit 20, a control circuit 22, a memory 24, and a user interface 26, the functionality of which will be described in more detail below. Further, the first computer device 16 may comprise a visualization circuit 28 and/or a display 30. In some embodiments, the first computer device 16 may be a personal computer, a laptop, a notebook, a MAC, a smartphone, or any other type of suitable smart device.

The second computer device 18 comprises a DUT database 32, and an instrument database 34. Optionally, the second computer device 18 may comprise a 3GPP database 36. For example, the second computer device 18 may be established as a server, wherein the databases 32, 34, 36 may be stored on a suitable memory of the server.

It is noted that the analysis system 10 may comprise further computer devices, for example further servers. The databases 32, 34, 36 may be distributed over the several servers, i.e. the databases 32, 34, 36 may be established as cloud databases, respectively.

If the analysis system 10 does not comprise the second computer device 18, the databases 32, 34, 36 may be stored in the memory 24 of the first computer device 16.

Due to the large variety of different possible configurations of the uplink and downlink channels of the device under test 14, which are collectively denoted as "band configurations" in the following, it is difficult and time-consuming to assess whether the test instrument 12 is suitable for performing tests on the device under test 14.

Figure 2:
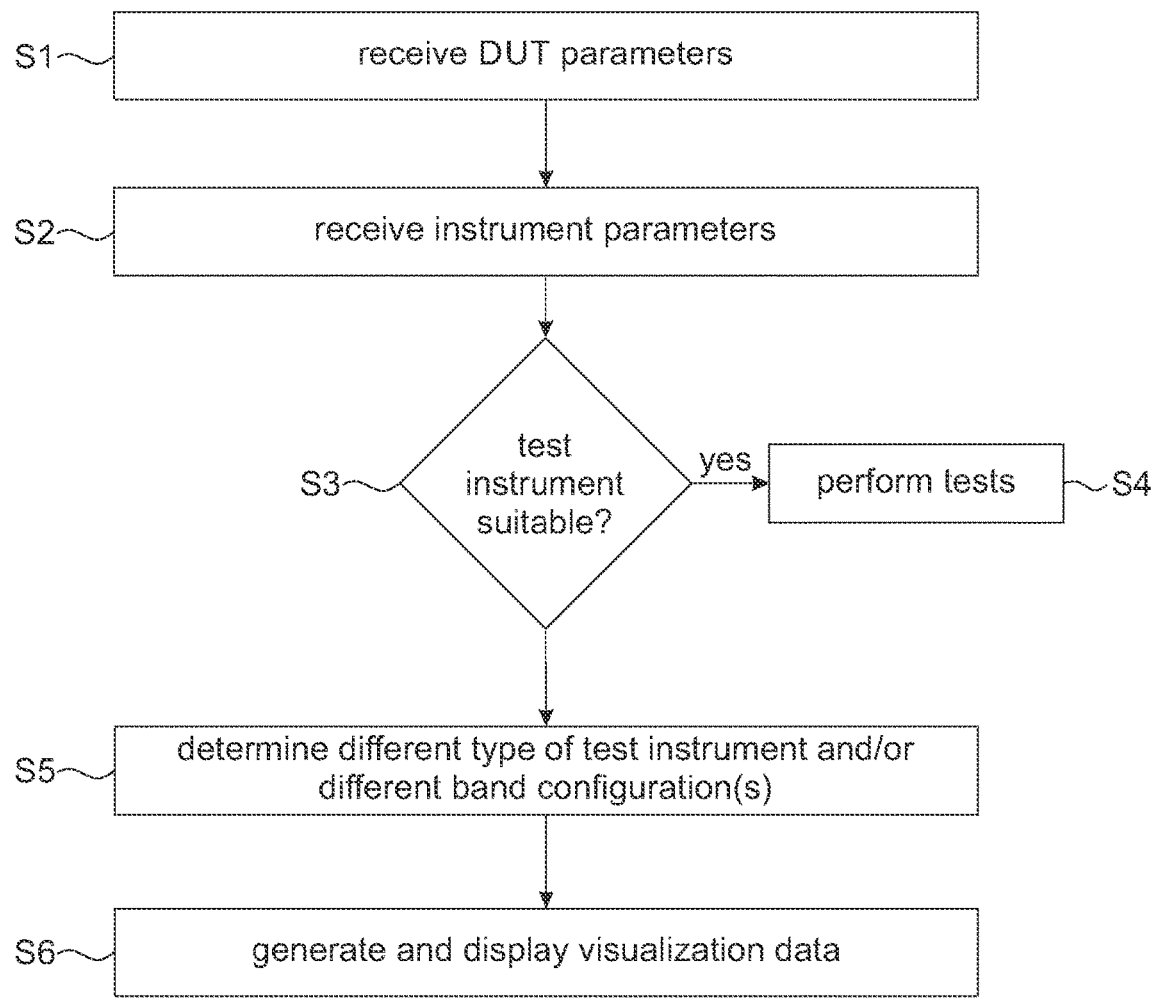
FIG. 2 depicts a representative flow chart of a method according to an embodiment of the present disclosure.

The analysis system 10 is configured to perform a method of analyzing test capabilities of the mobile communication test instrument 12, which is described in the following with reference to the example shown in FIG. 2.

In some embodiments, a computer program product embodied on a non-transitory computer-readable medium may be provided, for example stored in the memory 24 of the first computer device 16. The computer program product comprises program code being configured to perform the method, for parts thereof, described in the following when the program code is executed on a processing circuit, for example on a processing circuit of the analysis circuit 20 and/or of the control circuit 22.

DUT parameters are received by the analysis circuit 20 (step S1). In general, the DUT parameters are associated with the device under test 14. In some embodiments, the DUT parameters comprise information on a subset of band configurations of the device under test 14, wherein the subset of band configurations is to be tested.

In some embodiments, the subset of band configurations to be tested may be a list of different band configurations to be tested. In some embodiments, the DUT parameters may comprise information on bandwidths to be tested and/or on a MIMO configuration of the device under test 14. In some embodiments, a user may input the subset of band configurations via the user interface 26.

Alternatively or additionally, the user may adapt individual band configurations of the subset of band configurations, add individual band configurations to the subset of band configurations, and/or remove individual band configurations from the subset of band configurations.

Alternatively or additionally, the subset of band configurations may comprise standardized band configurations of the device under test 14 that are to be tested routinely. For example, these standardized band configurations may be loaded from the DUT database 32.

Test instrument parameters are received from the instrument database 34 by the analysis circuit 20 (step S2). In general, the test instrument parameters comprise information on features of the test instrument 12, such as a number of RF units of the test instrument 12, a number of IF units of the test instrument 12, and/or a number of accelerator units of the test instrument 12.

Based on the DUT parameters and based on the test instrument parameters, the analysis circuit 20 determines whether the test instrument is suitable for testing the device under test 14 being configured according to the subset of band configurations (step S3).

The number of RF units, the number of IF units, and the number of accelerator units determine the test capabilities of the test instrument at least partially. Conversely, the corresponding test instrument parameters can be used to assess whether the subset of band configurations of the device under test 14 can be tested by the test instrument 12.

For example, if an RF unit of the test instrument 12 has four downlink paths, and each downlink path has a bandwidth of 1 GHz, certain constraints apply to the band configuration of the device under test 14. If 4×4 MIMO is requested, all requested cells have to be within a bandwidth of 1 GHz. If 2×2 MIMO is requested, all requested cells have to be within a bandwidth of 1+1 GHz. If SISO is requested, all requested cells have to be within a bandwidth of 1+1+1 GHz.

If the analysis circuit 20 determines that the test instrument 12 is suitable for testing the device under test 14, test corresponding to the subset of band configurations may be performed automatically (step S4).

In some embodiments, the control circuit 22 may control the test instrument 12 and/or the device under test 14 such that the corresponding tests are performed.

If the analysis circuit 20 determines that the test instrument 12 is unsuitable for testing the device under test 14, a different type of test instrument being suitable for testing the device under test 14 is automatically determined, and/or at least one different band configuration of the device under test 14 is automatically determined (step S5).

In other words, a suitable test instrument for testing the device under test 14 and/or at least one different band configuration of the device under test 14 that can be tested with the test instrument 12 may be automatically recommended to the user.

The different type of test instrument may be determined based on information comprised in the instrument database 34.

The instrument database 34 may comprise information on features of a plurality of different test instruments. In other words, the instrument database 34 may comprise sets of test instrument parameters associated with a plurality of different types of test instruments.

In some embodiments, a list of different types of test instruments being compatible with the subset of band configurations of the device under test 14 may be generated.

The at least one different band configuration of the device under test 14 may be determined based on information comprised in the DUT database 32.

For example, the DUT database 32 may comprise a plurality of different (valid) band configurations of the device under test 14. Thus, the at least one different band configuration may be determined by comparing the plurality of band configurations stored in the DUT database 32 with the test instrument parameters, such that (valid) band configurations of the device under test 14 that are compatible with the test instrument can be determined.

In some embodiments, a list of band configurations of the device under test 14 being compatible with the test instrument 12 is generated.

Optionally, the received DUT parameters are compared with a database of valid DUT configurations stored in the 3GPP database 36 by the analysis circuit 20 in order to determine whether the subset of configurations of the device under test 14 is valid.

If the subset of band configurations is invalid, one or more of the band configurations comprised in the subset of band configurations may be automatically corrected by the analysis circuit 20, for example based on information comprised in the DUT database 32.

Alternatively or additionally, a corresponding warning may be generated and displayed on the display 30.

Visualization data is generated by the visualization circuit 28, wherein the visualization data comprises information on the DUT parameters, the test instrument parameters, and/or whether the test instrument 12 is suitable for testing the device under test 14 (step S6).

In general, the visualization data may comprise lists, diagrams, graphs, color-coded backgrounds, labels, warning signs, etc., such that the corresponding information is presented to the user in an illustrative way.

Figure 3:
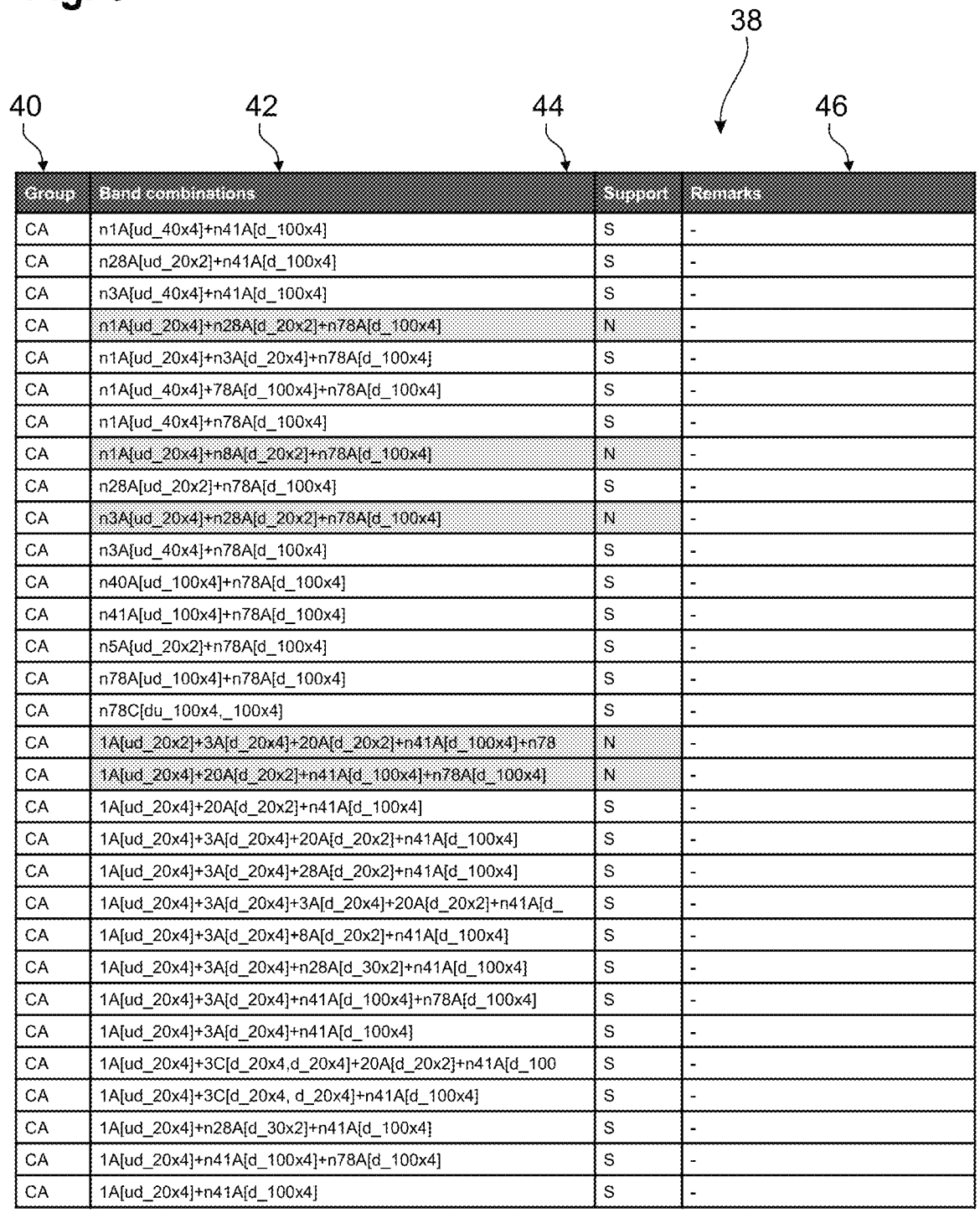
FIG. 3 depicts a list of band configurations of a device under test.

One particular example is shown in FIG. 3, wherein the visualization data comprises a list 38 of the received subset of band configurations. The list 38 comprises a first column 40 indicating the group of the respective band configuration. The list 38 further comprises a second column 42 comprising information on the bands combined in the respective band configuration of the device under test 14. The list 38 further comprises a third column 44 indicating whether the respective band configuration is compatible with the test instrument 12, i.e. whether the respective band configuration can be tested by the test instrument 12.

In the example shown in FIG. 3, an "S" in the third column 44 means that the respective band configuration is compatible with the test instrument 12, while an "N" indicates that the respective band configuration is not compatible with the test instrument 12. A third option, e.g. "R", may be provided, wherein the respective band configuration is compatible with the test instrument 12 under certain restrictions.

In the example shown in FIG. 3, the list 38 further comprises a color-coded background, wherein band configurations that are not supported by the test instrument 12 have a different background color than band configurations that are supported.

The list 38 may further comprise a fourth column 46 comprising additional remarks regarding the respective band configuration. For example, the fourth column 46 may comprise information on the restrictions under which the test instrument 12 is compatible with the respective band configuration.

As another example, the fourth column 46 may comprise information on different types of test instruments being compatible with the respective band configuration and/or on alternative band configurations being compatible with the test instrument 12.

The generated visualization data may be displayed by the display 30.

Certain embodiments disclosed components, such as the analysis system 10, the test instrument 12, and the device under test 14, that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

In some embodiments, a computer readable media is provided with the computer program instructions stored thereon, that when executed on one or more computing devices, cause the one or more computer devices to perform one or more of the steps of method claims provided below.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

Throughout this specification, terms of art may be used. These terms are to take on their ordinary meaning in the art from which they come, unless specifically defined herein or the context of their use would clearly suggest otherwise.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of analyzing test capabilities of a mobile communication test instrument, the method comprising the steps of:
receiving device under test (DUT) parameters being associated with a device under test, wherein the DUT parameters comprise information on a subset of band configurations associated with a device under test, wherein the subset of band configurations is to be tested;
receiving, from an instrument database, test instrument parameters being associated with the test instrument, wherein the test instrument parameters comprise information on features of the test instrument, wherein the test instrument parameters comprise information on a number of accelerator units of the test instrument, wherein the accelerator units are configured to perform layer 1 processing to emulate a mobile communication cell; and
determining, by an analysis circuit, whether the test instrument is suitable for testing the device under test based on the DUT parameters and based on the test instrument parameters.

2. The method of claim 1, wherein the test instrument parameters comprise information on a number of radio frequency (RF) units of the test instrument, and/or on a number of intermediate frequency (IF) units of the test instrument.

3. The method of claim 1, wherein the DUT parameters comprise information on a bandwidth to be tested and/or on a multiple-input-multiple-output (MIMO) configuration of the device under test.

4. The method of claim 1, wherein, if it is determined that the test instrument is unsuitable for testing the device under test, a different type of test instrument being suitable for testing the device under test is automatically determined.

5. The method of claim 4, wherein the instrument database comprises information on features of a plurality of different test instruments, and wherein the different type of test instrument is determined based on the information on features encompassed in the instrument database.

6. The method of claim 4, wherein a list of different types of test instruments being compatible with the band configuration of the device under test is generated.

7. The method of claim 1, wherein, if it is determined that the test instrument is unsuitable for testing the device under test, a different band configuration of the device under test is automatically determined, wherein the test instrument is suitable for testing the device under test with the different band configuration.

8. The method of claim 7, wherein a DUT database comprising information on different possible band configurations of the device under test is provided, and wherein the different band configuration is determined based on the DUT database.

9. The method of claim 7, wherein a list of band configurations of the device under test being compatible with the test instrument is generated.

10. The method of claim 1, wherein the DUT parameters are compared with a database of valid DUT configurations in order to determine whether the configuration of the device under test is valid.

11. The method of claim 1, wherein visualization data is generated by a visualization circuit, wherein the visualization data comprises information on the DUT parameters, the test instrument parameters, and/or whether the test instrument is suitable for testing the device under test.

12. The method of claim 11, wherein the visualization data is displayed by a display.

13. The method of claim 1, wherein the subset of band configurations to be tested is adaptable by a user interface.

14. The method of claim 1, wherein the subset of band configurations relate to LTE and/or 5G configurations.

15. The method of claim 1, wherein a control circuit is provided, wherein the control circuit is configured to automatically control the test instrument and/or the device under test.

16. A computer program product embodied on a non-transitory computer-readable medium, the computer program product comprising program code being configured to perform the method of claim 1 when the program code is executed on a processing circuit.

17. An analysis system for analyzing test capabilities of a mobile communication test instrument, the analysis system comprising an instrument database and an analysis circuit,
wherein the analysis circuit is configured to receive DUT parameters, wherein the DUT parameters are associated with a device under test, wherein the DUT parameters comprise information on a subset of band configurations associated with a device under test, wherein the subset of band configurations is to be tested,
wherein the analysis circuit is configured to receive test instrument parameters from the instrument database, wherein the test instrument parameters are associated with the test instrument, wherein the test instrument parameters comprise information on features of the test instrument, wherein the test instrument parameters comprise information on a number of accelerator units of the test instrument, wherein the accelerator units are configured to perform layer 1 processing to emulate a mobile communication cell, and
wherein the analysis circuit is configured to determine whether the test instrument is suitable for testing the device under test based on the DUT parameters and based on the test instrument parameters.

18. The analysis system of claim 17, wherein the analysis circuit and the instrument database are integrated in a common computer device.

19. The analysis system of claim 17, wherein the analysis circuit and the instrument database are integrated in different computer devices.

20. The analysis system of claim 17, wherein the instrument database is established as a cloud database.

* * * * *